(12) United States Patent
Evans

(10) Patent No.: US 7,438,863 B2
(45) Date of Patent: *Oct. 21, 2008

(54) MULTI-CATALYST INJECTION SYSTEM

(75) Inventor: Martin Evans, Tolland, CT (US)

(73) Assignee: Intercat Equipment, Inc., Manasquan, NJ (US)

( * ) Notice: Subject to any disclaimer, the term of this patent is extended or adjusted under 35 U.S.C. 154(b) by 342 days.

This patent is subject to a terminal disclaimer.

(21) Appl. No.: 11/276,899

(22) Filed: Mar. 17, 2006

(65) Prior Publication Data

US 2006/0140824 A1 Jun. 29, 2006

Related U.S. Application Data

(63) Continuation of application No. 10/717,250, filed on Nov. 19, 2003, now Pat. No. 7,364,708.

(51) Int. Cl.
*F27B 15/08* (2006.01)
*C10G 35/00* (2006.01)
*C10G 11/00* (2006.01)
*G05D 7/00* (2006.01)
*G05D 9/00* (2006.01)
*G05D 16/00* (2006.01)

(52) U.S. Cl. .............. 422/145; 422/105; 422/107; 422/108; 422/110; 422/111; 422/112; 422/113; 422/139; 422/140; 422/141; 208/113; 208/176

(58) Field of Classification Search ................ 422/105, 422/107, 108, 110, 111, 112, 113, 139, 140, 422/141, 145, 147, 144; 208/113, 176

See application file for complete search history.

(56) References Cited

U.S. PATENT DOCUMENTS

| | | | |
|---|---|---|---|
| 2,616,591 A | | 11/1952 | Haugen |
| 3,850,582 A | * | 11/1974 | Luckenbach ............... 422/116 |
| 4,660,881 A | | 4/1987 | Komeya et al. |
| 4,782,427 A | | 11/1988 | Marks |
| 4,809,889 A | | 3/1989 | Friedman |
| 5,055,176 A | | 10/1991 | Herbst et al. |
| 5,286,370 A | | 2/1994 | Chu et al. |
| 5,339,236 A | | 8/1994 | Tamagawa |
| 5,810,045 A | | 9/1998 | Evans |
| 6,358,401 B1 | | 3/2002 | Evans |
| 6,974,559 B2 | | 12/2005 | Evans |
| 2001/0041117 A1 | | 11/2001 | Comardo |
| 2004/0166032 A1 | | 8/2004 | Evans |
| 2006/0138028 A1 | * | 6/2006 | Evans ...................... 208/176 |
| 2006/0147358 A1 | * | 7/2006 | Evans ...................... 422/232 |

OTHER PUBLICATIONS

"IMS to Control Room", Dwg. S-29, Sheet 1, Intercat, Savannah, Georgia, Nov. 26, 2001.

* cited by examiner

*Primary Examiner*—Walter D Griffin
*Assistant Examiner*—Huy-Tram Nguyen

(57) ABSTRACT

The invention is a multi-catalyst injection system. In one embodiment, the system comprises a plurality of catalyst storage regions associated with a vessel and a metering device associated with the vessel. The metering device is configured to provide a metric indicative of an amount of catalyst dispensed from a selected one of the catalyst storage regions.

9 Claims, 6 Drawing Sheets

MULTI-CATALYST INJECTION SYSTEM

CROSS-REFERENCE TO RELATED APPLICATIONS

This application is a continuation of U.S. patent application Ser. No. 10/717,250 filed Nov. 19, 2003 now U.S. Pat. No. 7,364,708, which is hereby incorporated by reference in its entirety. This application is related to U.S. patent application Ser. No. 11/276,893, filed Mar. 17, 2006, entitled "Method and Apparatus for Metering Catalyst in a Fluid Catalytic Cracking Catalyst Injection System" by Evans and U.S. patent application Ser. No. 11/276,903, filed Mar. 17, 2006, entitled "Mobile Fluid Catalytic Cracking Injection System" by Evans, both of which are hereby incorporated by reference in their entireties.

BACKGROUND OF THE INVENTION

1. Field of the Invention

Embodiments of the invention generally relate to fluid catalyst injection systems for fluid catalyst cracking units.

2. Background of the Related Art

Fluid catalyst cracking units (FCCU) are commonly used in petroleum refining to break long chain hydrocarbons present in crude oil and to adjust the product mix recovered at the distiller. A main catalyst is generally introduced into the FCCU by a catalyst injection system which periodically meters out catalyst for injection over a predefined period of time. Such injection systems are available from Intercat, Inc., located in Sea Girt, N.J. Other examples of conventional injection systems are described in U.S. Pat. No. 5,389,239, issued Feb. 14, 1995, which is incorporated by reference in its entirety.

In addition to the main catalyst, it is often beneficial to inject other catalysts into the FCCU to further influence the refining process. For example, some catalyst are formulated to control certain types of emissions, such as the amount of sulfur- and nitrogen-containing compounds present in refinery emissions. Other catalysts may be formulated to influence the product mix recovered in the distiller. For example, catalyst may be formulated to produce more diesel fuel relative to gasoline or to increase the amount of liquid petroleum gas produced, among others. As these injection systems are typically supported on a separate foundation and hard pipe connected to the FCCU, the flexibility of the refiner to rapidly add an additional catalyst injection system is very limited.

For example, the time required to plan and install a new catalyst injection system may prevent the refiner from taking advantage of market conditions favorable to a certain product mix not achievable using the catalyst injection systems currently coupled to the FCCU. The difficulty in providing quick process adjustment through the injection of additional catalyst in a new catalyst injection system also hampers the ability of the refiner to quickly adjust refinery emissions due to changes in regulations, differences in the chemical make-up of crude oil or process equipment failure. Furthermore, as catalyst injection systems are expensive to install, it is undesirable to have unused catalyst injection systems stationed online as a precaution against any unanticipated need for process control.

Therefore, there is a need for a catalyst injection system which enhances process flexibility of fluid catalyst cracking units.

SUMMARY OF THE INVENTION

The invention is a multi-catalyst injection system. In one embodiment, the system comprises a vessel having at least two compartments adapted to store catalyst therein. Each compartment is coupled to a respective dispense mechanism to independently control the flow of catalyst from each compartment of the injection system.

In another embodiment, the system comprises a plurality of catalyst storage regions associated with a vessel and a metering device associated with the vessel. The metering device is configured to provide a metric indicative of an amount of catalyst dispensed from a selected one of the catalyst storage regions.

In yet another embodiment, a method of providing catalyst to a fluid catalyst cracking unit include providing an injection apparatus having a plurality of separate catalyst storage regions to a fluid catalyst cracking unit (FCCU), selectively delivering catalyst through the injection apparatus to the FCCU, and determining an amount of catalyst delivered to the FCCU through the injection apparatus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
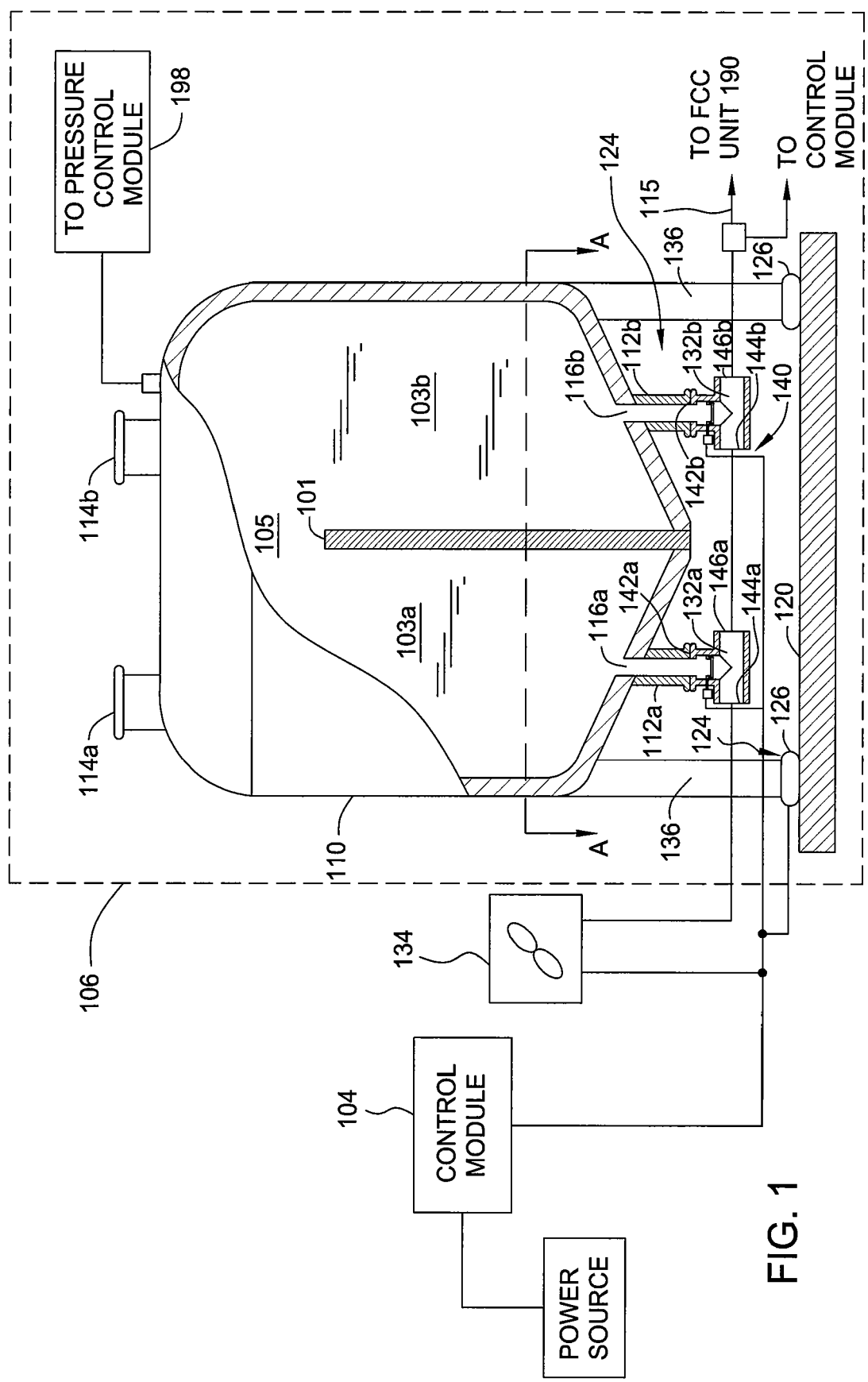
FIG. 1 is a simplified schematic diagram of one embodiment of a fluid catalytic cracking system having a multi-catalyst injection system according to the present invention.

FIG. 1 is a simplified schematic diagram of one embodiment of a fluid catalytic cracking (FCC) system 100 having one or more multi-catalyst injection systems 106 according to the present invention. The injection system 106 generally includes a container suitable for storing at least two catalysts and a dispense system for independently dispensing catalyst from the vessel 110. It is contemplated that the dispense system may dispense more than one catalyst from the vessel 110 simultaneously, sequentially or combinations thereof.

The ability of the injection system 106 to handle more than one catalyst allows the refiner to reduce the number of injections systems required to control the use of a given number of catalysts, and provides a cost effective means for having excess catalyst dispensing capability available for unplanned addition of different (e.g., new) catalyst to the refining process.

The FCC system 100 includes a fluid catalytic cracking (FCC) unit 190 coupled to a distiller (not shown), and to one or more catalyst injection systems 106. One injection system 106 is shown in FIG. 1. A control module 104 is coupled to the injection system 106 for controlling the operations of the system 106.

The FCC unit 190 is adapted to heat crude oil received from an oil feed stock source (not shown) and convert the oil vapor into one or more different petroleum products including liquefied petroleum gas (LPG) and gasoline. In one embodiment, the FCC unit 190 generally includes a regenerator and a cracking chamber arranged in a conventional manner. One example of an exemplary FCC unit is described in U.S. patent application Ser. No. 10/445,453, filed May 27, 2003, which is hereby incorporated by reference in its entirety.

The catalyst injection system 106 is coupled by a delivery line 115 to the FCC unit 190 to supply and/or replenish catalyst for use in refining the crude oil stock. In one embodiment, the catalyst injection system 106 includes a storage vessel 110 coupled to a dispense system 140 and a pressure control module 198. The catalyst injection system further comprises a fluid source 134 coupled to a portion of the delivery line 115 upstream of the vessel 110 and FCCU 190. Exemplary injection systems that may be adapted to benefit from the invention are described in U.S. Pat. No. 5,389,236, issued Feb. 14, 1995, and in U.S. Pat. No. 6,358,401, issued Mar. 19, 2002, both of which are hereby incorporated by reference in their entireties. Other catalyst injection systems that may be adapted to benefit from the invention are available from Intercat, Inc., of Sea Girt, N.J., among other sources.

In the embodiment depicted in FIG. 1, a single catalyst injection system 106 is shown. However, it is contemplated that any number of catalyst injection systems, or a single system for selectively injecting catalyst from a plurality of catalyst sources, may be utilized.

Figure 2:
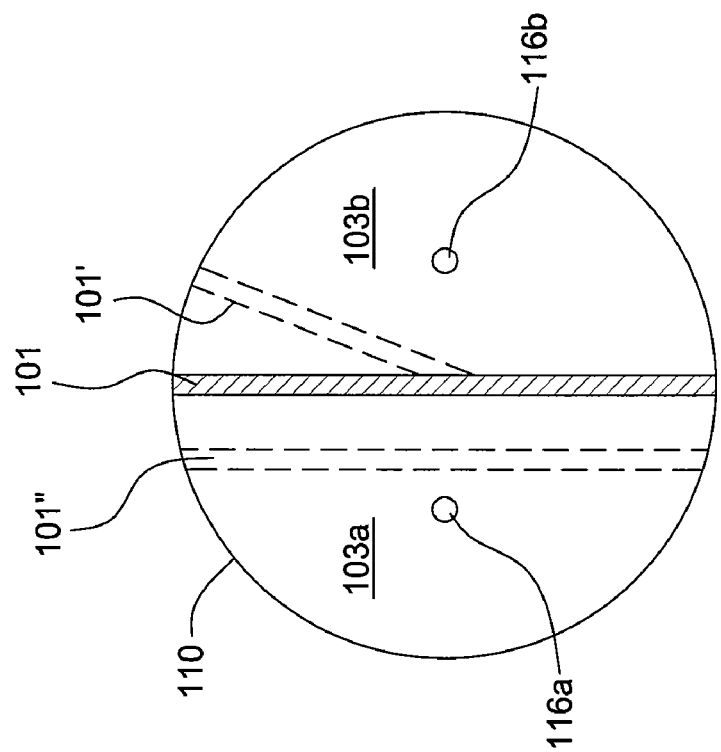
FIG. 2 is a cross-sectional view of the injection system of FIG. 1 taken along line A-A.

Referring simultaneously to FIG. 1 and to FIG. 2, which is a cross-sectional view of the storage vessel 110 illustrated in FIG. 1 along line A-A, the storage vessel 110 is typically a metal or other suitable container having two or more compartments 103a and 103b (hereinafter collectively referred to as "compartments 103") for individually storing a catalyst. The compartments 103 share a common pressure plenum 105 positioned at the upper end of the vessel 110. Although it is intended that different catalysts will be stored in each compartment 103, it is contemplated that two or more of the compartments 103 may store the same catalyst.

The storage vessel 110 includes two or more fill ports 114a or 114b (hereinafter collectively referred to as "fill ports 114"), two and more discharge ports 116a and 116b (hereinafter collectively referred to as "discharge ports 116"). Each compartment 103 is associated with an associated pair of the discharge and fill ports 116, 114 to isolate the filling, storage and discharge of the catalysts stored in a respective compartment 103 of the vessel 110. Each discharge port 116 is coupled at the bottom of the vessel 110 to the dispense system 140. In one embodiment, the vessel 110 is suitable for use in elevated pressures.

In one embodiment, the compartments 103 are separated by at least one separator 101. The separator 101 is coupled to the bottom of the vessel 110, separating the discharge ports 116. The separator 101 extends vertically within the interior of the vessel 110. The separator 101 extends vertically within the interior of the vessel 110 and is coupled to the side walls of the vessel 110 to separate the compartments 103. In the embodiment depicted in FIG. 1, the separator does not extend completely to the top of the vessel 110, such that the plenum 105 is free to communicate across the top of the separator 101 between the compartments 103. It is also contemplated that the separator 110 may extend from the bottom to the top of the vessel 110, and may include a plurality of holes (not shown) formed through the separator 101 near the fill ports 114 to allow the plenum 105 to communicate with each of the compartments 103.

In the embodiment illustrated, the separator 101 separates the storage vessel 110 into two separate compartments 103a and 103b, but those skilled in the art will appreciate that the storage vessel 110 may be separated into any number of compartments 103, as will be illustrated further herein. In one embodiment, the separator 101 has a substantially planar shape that is positioned to separate the storage vessel 110 into compartments 103 having substantially equal volumes. In another embodiment, the separator 101 has a "dog-leg" shape that separates the storage vessel 110 into compartments 103 having unequal volumes (indicated by dashed line 101'). In yet another embodiment, the separator 101 has a substantially straight shape, but is positioned slightly off-center within the storage vessel 110 to divide the storage vessel 110 into compartments 103 having unequal volumes (as indicated by dashed line 101"). Configuring the compartments 103 with unequal volume is particularly suitable for use with two-part catalysts that require separate injection at different volumes, and in systems where greater quantity of one catalyst is used relative another, but the total volume of catalyst used make it desirable to share a common injection system.

The dispense system 140 comprises metering devices 112a, 112b (hereinafter collectively referred to as "metering devices 112"), each coupled to a respective discharge port 116. In other words, the dispense system 140 comprises one metering device 112 for each compartment 103 of the storage vessel 100. The metering devices 112 are typically coupled to the control module 104 so that an amount of catalyst delivered to the delivery line 115 may be monitored or metered based on a production plan or in response to a real time need, for example, in response to flag from a process sensor.

The metering device 112 controls the amount of catalyst injected from its associated compartment 103 in the storage vessel 110 to the FCC unit 190. The metering device 112 may be a shut-off valve, a rotary valve, a mass flow controller, a shot pot, a flow sensor, a positive displacement pump or other devices suitable for regulating the amount of catalyst dispensed from the storage vessel 110 for delivery to the delivery line 115. The metering device 112 may determine the amount of catalyst by weight, volume, timed dispense or by other manners. Depending on the catalyst requirements of the system 100, the metering device 112 is typically configured to provide about 5 to about 4000 pounds per day of additive-type catalysts (process control catalyst) or may be configured to provide about 1 to about 20 tons per day of main catalyst. The metering device 112 typically delivers catalysts over the course of a planned production cycle, typically 24 hours, in multiple shots of predetermined amounts spaced over the production cycle. However, catalysts may also be added in an "as needed" basis or in response to information provided by a closed loop system output monitoring device or sensor.

In the embodiment depicted in FIG. 1, the metering devices 112 are control valves 132a and 132b (hereinafter collectively referred to as "control valves 132") that regulate the amount of catalyst delivered from the storage vessel 110 to the delivery line 115 by a timed actuation.

The control valves 132 are coupled to the delivery line 115 between the fluid source 134 and the FCC unit 190. Although the control valves 132 are shown in FIG. 1 as coupled in series on the delivery line 115, the control valves 132 may alternatively be coupled in parallel between the fluid source 132 and the FCC unit 190.

The control valves 132 generally include a first port 142a, 142b that are coupled to a respective discharge port 116 of the storage vessel 110. Second ports 144a, 144b (hereinafter collectively referred to as "second ports 144") of the control valves 132 are coupled to the portion of the delivery line 108 extending from the fluid source 134, such as a blower or compressor. Third ports 146a, 146b (hereinafter collectively referred to as "third ports 146") of the control valves 132 are coupled to a portion of the delivery line 115 leading to the FCCU 190. When actuated to an open position, the control valves 132 allow catalyst to flow from the storage vessel 110 towards the third port 146, where fluid provided from the fluid source 134, moving from the second port 144 towards the third port 146, entrains and carries the catalyst through the delivery line 115 to the FCCU 190. In one embodiment, the fluid source 134 provides air at about 80 psi (about 5.6 kg/cm$^2$).

Figure 3:
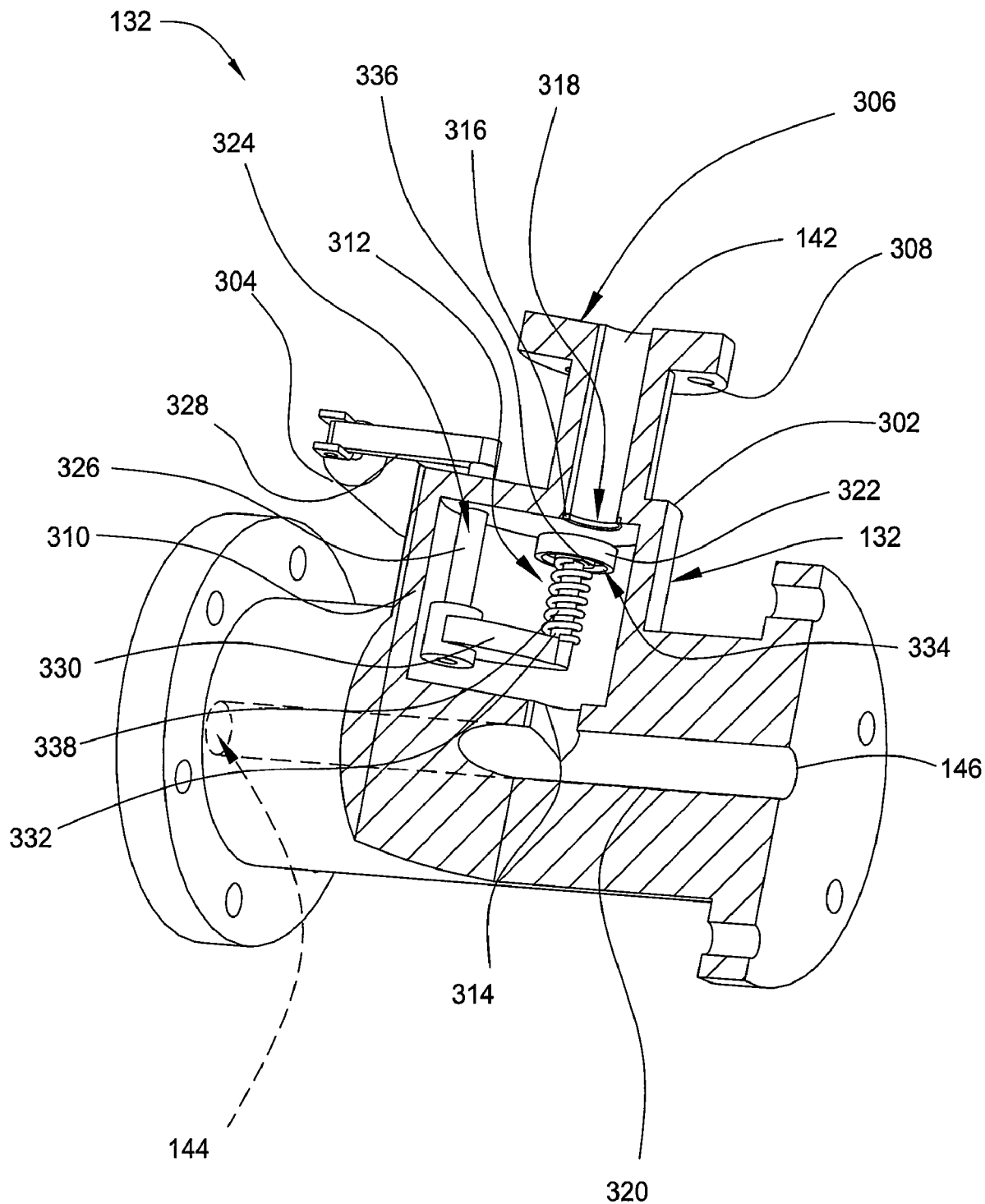
FIG. 3 is a sectional, isometric view of one embodiment of a control valve for use with the multi-catalyst injection system of FIGS. 1 and 2.

FIG. 3 is a sectional, isometric view of one embodiment of a control valve 132. The control valve 132 includes a valve body 302 and an actuator 304. The valve body 302 includes a first flange 306 having the first port 142 formed therethrough. The first flange 306 also includes a plurality of mounting holes 308 to facilitate coupling the valve body 302 to a discharge port 116 of the storage vessel 110 shown in FIG. 1. The first flange 306 is coupled to a housing 310. The housing 310 of the valve body 302 defines a cavity 312 that is coupled to the first port 142 by a valve seat 316 disposed at one end and a first passage 314 coupled to a second passage 320 (shown in partially in phantom) that couples the second and third ports 144, 146 at a second end. The valve seat 316 has an orifice 318 formed therethrough that fluidly couples the cavity 312 to the discharge port 116 of the storage vessel 110 (shown in FIG. 1). The orifice 318 is typically between about ⅞ to about 1¾ inches in diameter.

The orifice 318 of the control valve 132 is opened and closed by selectively moving a shear disk 322 laterally across the seat 316. The shear disk 322 generally has a lapped metallic upper sealing surface that seals against the valve seat 316, which is typically also metallic. As the shear disk 322 is disposed on the downstream side of the valve seat 316, any backpressure generated in the FCCU 190 will not inadvertently open the valve 132.

An actuator assembly 324 couples the shear disk 322 to the actuator 304 that controls the open and closed state of the control valve 132. The actuator assembly 324 includes a shaft 326 that extends through the housing 310. A first arm 328 of the actuator assembly 324 is coupled to an end of the shaft 326 disposed on the outside of the housing 310. A second arm 330 of the actuator assembly 324 is coupled to an end of the shaft 326 disposed in the cavity 312 of the housing 310. A pin 332 extends from the second arm 330 and engages the shear disk 322. A recess 334 formed in a lower surface of the shear disk 322 receives the pin 332 and prevents the pin 332 and shear disk 322 from becoming disengaged as the pin 332 selectively urges the shear disk 322 laterally over or clear of the orifice 318.

An annular bushing 336 residing in the recess 334 circumscribes the end of the pin 332. The bushing 336 is retained by the pin 332 and can move axially along the pin 332. A diameter of the bushing 336 is generally less than a diameter of the recess 334 to that the shear disk 322 may rotate eccentrically round the bushing 336 and the pin 332 as the shear disk 322 is moved laterally.

A biasing member 338 (e.g., a spring) is disposed around the pin 332 between the second arm 330 and the bushing 336. The member 338 biases the bushing 336 and the shear disk 322 away from the second arm 330 and against the valve seat 316 so that the shear disk 322 seals the orifice 318 when the shear disk 322 is positioned over the valve seat 316.

As depicted in FIG. 3, the actuator 304 is coupled to the first arm 328 and rotates the shaft 326 to move the shear disk 322 between positions that open and close the orifice 318. As the pin and bushing 332, 336 have a diameter smaller than the recess 324 formed in the shear disk 322, the shear disk 322 precesses about the shaft 326 as the control valve 132 is opened and closed (i.e., the shear disk 322 rotates eccentrically about the pin 332 while additionally rotating about the shaft 326). This motion of the shear disk 322 over the valve seat 316 provides a self-lapping, seat cleaning action that prevents the catalyst from grooving the sealing surfaces of the shear disk 322 and valve seat 316 that could cause valve leakage. It has been found that this configuration of valve operation substantially extends the service life of the valve 132. None the less, the catalyst injection system of the present invention may alternatively utilize other control valves.

Referring back to FIG. 1, the pressure control module 198 controls the pressure within plenum 105 of the storage vessel 110. The pressure control module 198 generally pressurizes the storage vessel 110 to about 5 to about 80 pounds per square inch (about 0.35 to about 5.6 kg/cm$^2$) during dispensing operations. The module 198 intermittently vents the storage vessel 110 to about atmospheric pressure to accommodate recharging the vessel 110 with catalyst.

The control module 104 is coupled to the injection system 106 to control the rates and/or amounts of catalyst that are delivered by the injection system 106 into the delivery line 115. In one embodiment, the control module 104 is coupled to the metering devices 112 so that an amount of catalyst delivered to the delivery line 115 may be monitored or metered. One suitable control module is described in U.S. patent application Ser. No. 10/304,670, filed Nov. 26, 2002, which is incorporated by reference herein in its entirety.

In one embodiment, the injection system 106 optionally includes one or more sensors 124 for providing a metric suitable for resolving the amount of catalyst passing through the metering devices 112 during each injection of catalyst. The sensors 124 may be configured to detect the levels (i.e., volume) of catalysts in the compartments 103 of the storage vessel 110, the weights of catalysts in the compartments 103 of the storage vessel 110, the rates of catalysts movement through the storage vessel 110, discharge ports 116, metering devices 112 and/or catalyst delivery line 115 or the like.

In the embodiment depicted in FIG. 1, the sensor 124 is a plurality of load cells 126 adapted to provide a metric indicative of the weight of catalyst in the compartments 103 of the storage vessel 110. The load cells 126 are respectively coupled to a plurality of legs 136 that supports the storage vessel 110 above a surface 120, such as a concrete pad. Each of the legs 136 has one load cell 126 coupled thereto. The control module 104 receives the outputs of the load cells 126. From sequential data samples obtained from the load cells 126, the control module 104 may resolve the net amount of injected catalyst after each actuation of the metering device 112. By using the measured changes in total weight of catalyst in the system 110, and assigning these changes to an individual compartment 103 depending on which valve 132 was open when the weight changed, the amount of each catalyst that is dispensed sequentially may be determined. Additionally, the net amount of catalyst dispensed over the course of the production cycle may be monitored so that variations in the amount of catalyst dispensed in each individual shot may be compensated for by adjusting the delivery attributes of the metering devices 112, for example, changing the open time of the control valves 132 to allow more (or less) catalyst to pass therethrough and into the FCCU 190.

The operation of the FCC system 100 is initiated when the control module 104 determines, for example based on a preset injection schedule, manual activation, output of a computer model run to optimize operation of the FCCU or on information provided by sensors, the amount of catalyst required by the system 100 to function at optimal efficiency (e.g., the amount of catalyst required to return the system's outputs to within a predefined process window). For example, catalyst additions in response to a sensed output metric may be utilized to maintain the system emissions at an acceptable level or to derive a desired product mix from the feed stock oil.

Based on the control module's determination, at least one particular catalyst suited to address a particular system need (e.g., emissions reduction) may be dispensed from the multi-catalyst injection system 106 and released into the delivery line 115. In one embodiment, several catalysts are dispensed simultaneously from a single injection system 106 and released into the delivery line 115. Thus, the number of total storage vessels 110 for containing catalysts may be reduced, and the FCC system 100 may be adapted to operate more efficiently with minimal system modifications.

Figure 4:
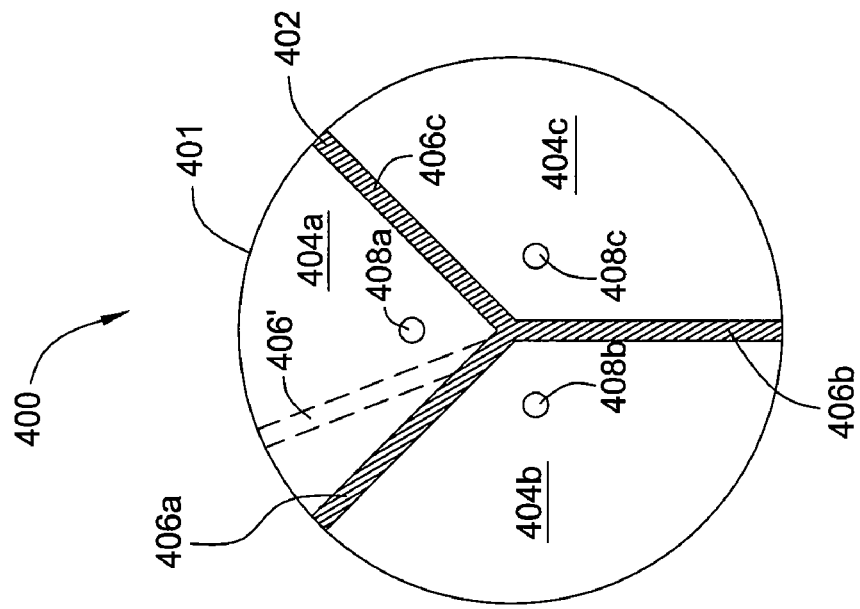
FIG. 4 depicts a sectional view of another embodiment of a multi-catalyst injection system according to the present invention.

FIG. 4 depicts a sectional view of another embodiment of a multi-catalyst injection system 400. The multi-catalyst injection system 400 is similar to the system 106 depicted in FIGS. 1 and 2 and comprises a storage vessel 401, a separator 402 and a plurality of compartments 404. In the embodiment illustrated, the storage vessel 401 is separated into three compartments 404a, 404b and 404c (hereinafter collectively referred to as "compartments 404") by the separator 402. The separator 402 comprises three flanges 406a, 406b and 406c (hereinafter collectively referred to as "flanges 406") that divide the storage vessel into the three compartments 404. Each of the three compartments 404 is further associated with a discharge port 408a, 408b or 408c (hereinafter collectively referred to as "discharge ports 408") formed through the vessel 401 and inlet ports (not shown). In one embodiment, the flanges 406 of the separator 402 are evenly spaced apart to divide the storage vessel 401 into compartments 404 of substantially equal volume. In another embodiment, the flanges 406 are spaced to divide the storage vessel 401 into compartments 404 of different volumes (as indicated by dashed line 406'). Although the separator 402 illustrated in FIG. 4 is depicted as having three flanges 402, those skilled in the art will appreciate that the separator 402 may comprise any number of flanges 402, for dividing the storage vessel 401 into any number of compartments 404 where the ratio of volume between at least two of the compartments 404 may be substantially equal or arranged in predefined volume ratios. Configuring the compartments 404 with unequal volume is particularly suitable for use with two-part catalysts that require separate injection at different volumes, and in systems where greater quantity of one catalyst is used relative another, but the total volume of catalyst used make it desirable to share a common injection system. Moreover, one of the compartments 404 may be kept empty to provide an on-line emergency injection system ready for loading catalyst for satisfying unplanned changes in processing requirements, thereby enabling the refiner to quickly take advantage of market conditions or regulatory issues, such as emissions.

Figure 5:
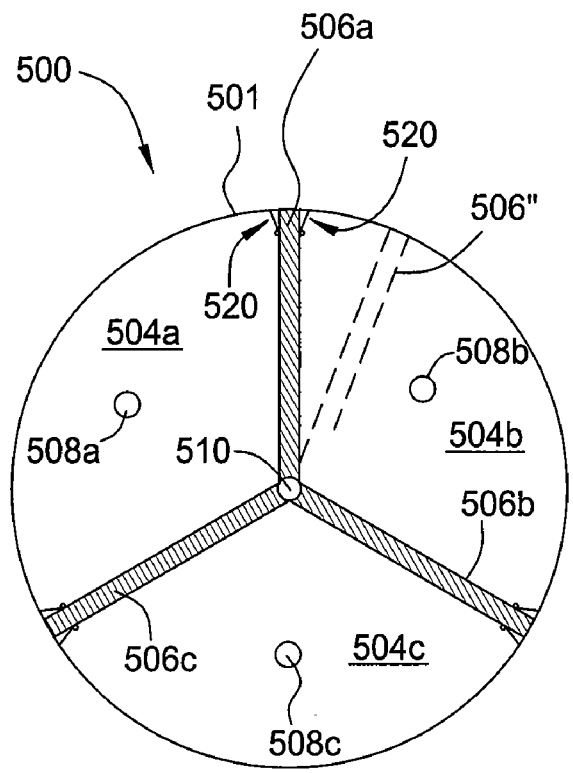
FIG. 5 depicts a sectional view of another embodiment of a multi-catalyst injection system having an adjustable separator according to the present invention.

FIG. 5 depicts a sectional view of another embodiment of a multi-catalyst injection system 500. The multi-catalyst injection system 500 is similar to the system 400 depicted in FIG. 4 and comprises a storage vessel 501, an adjustable separator 502 and one or more compartments 504. In the embodiment illustrated, a storage vessel 501 is separated into three compartments 504a, 504b and 504c (hereinafter collectively referred to as "compartments 504") by the adjustable separator 502. Each of the three compartments 504 is further associated with discharge port 508a, 508b or 508c (hereinafter collectively referred to as "discharge ports 508") and fill ports (not shown).

The separator 502 includes two or more flanges 506. At least two of the flanges 506 are coupled at a hinge 510 extending in an axial orientation within the vessel 501. The hinge 510 allows the relative orientation of the flanges 405 to be adjusted thereby allowing the volumetric ratio between compartments to be selectively adjusted. In the embodiment illustrated, the adjustable separator 510 comprises three flanges 506a, 506b and 506c (hereinafter collectively referred to as "flanges 506") that divide the storage vessel 501 into the three compartments 504. At least one of the flanges 506 may be rotated about the hinge 510 to adjust the volumetric ratio between the compartments 504.

Figure 6:
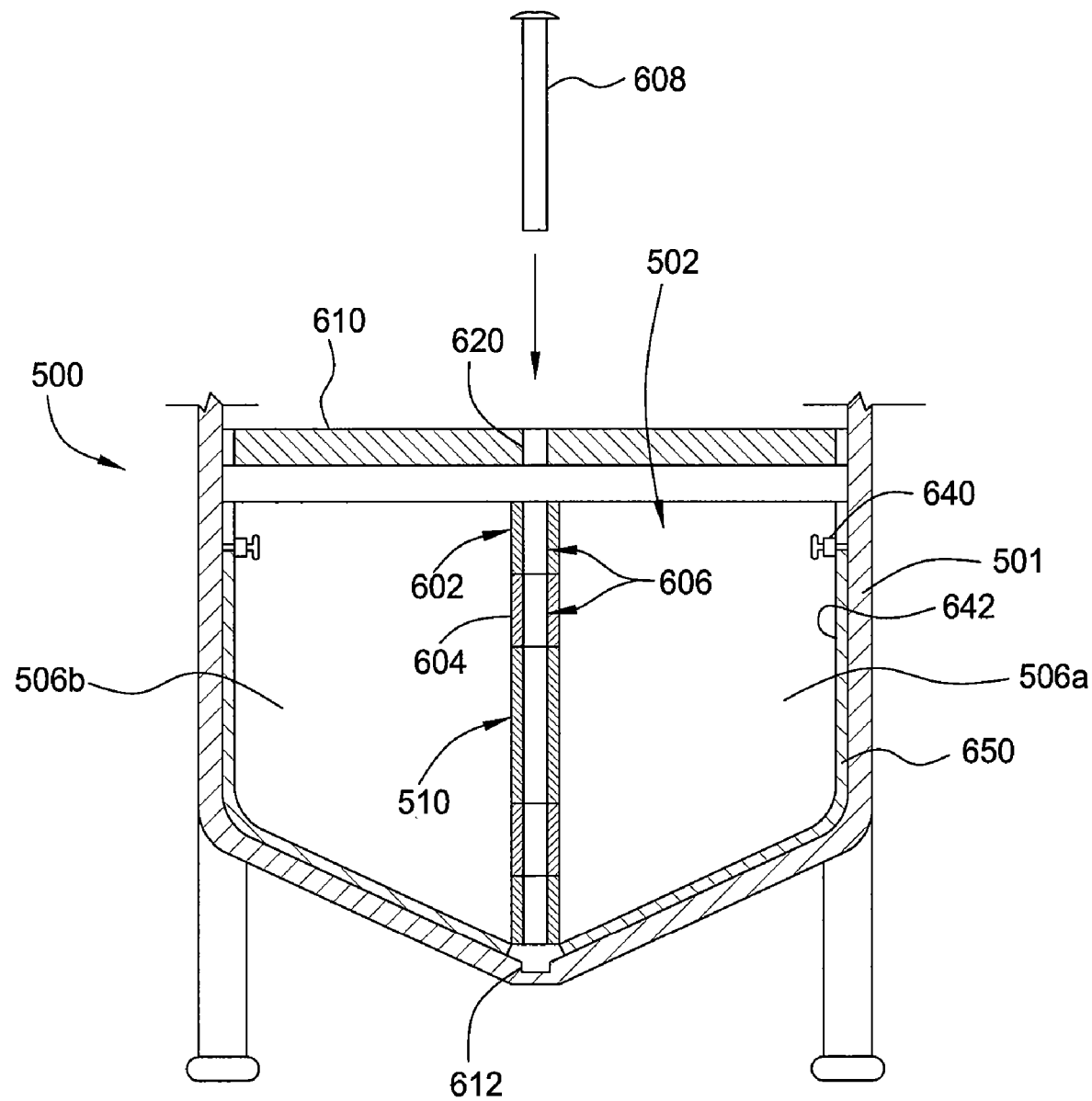
FIG. 6 depicts one embodiment of a separator hinge.

FIG. 6 is a side view of one embodiment of the hinge 510. The hinge 510 includes a first element 602 coupled to a first one of the flanges (506a) and a second element 604 coupled to a second one of the flanges (506b). The elements 602, 604 include a plurality of interleaving apertures 606 that accept a rod 608 passing therethrough. The rod 608 passed through a hole 620 formed through an upper brace 610 coupled to the sidewalls of the vessel 501 and engages a hole 612 formed in the bottom of the vessel 501. The brace 610 and hole 612 retain the rod 608 in an orientation that allows the flanges 506, retained by the elements 602, 604, to freely rotate around the rod 608.

The movable flanges 506 are fixed in orientation by a locking mechanism 640. In one embodiment, one locking mechanism 640 is coupled to each edge 642 of the flanges 506 adjacent the sidewall of the vessel 501. The locking mechanism 640 is generally adapted to releasably engage the sidewall of the vessel 501 in a manner that prevents rotation of the flange 506. Alternatively, the locking mechanism 640 may be disposed in another location within the vessel 501, and configured to secure the relative position of the flanges 506. For example, a locking mechanism may be configured to bind the hinge 510 or be in the form of a brace (not shown) disposed between two or more of the flanges.

Figure 7:
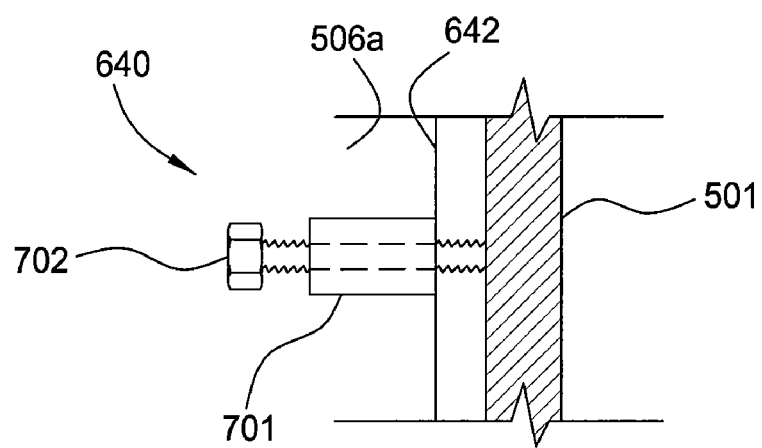
FIG. 7 depicts one embodiment of a separator locking mechanism.

FIG. 7 depicts one embodiment of the locking mechanism 640 that may be utilized to fix the orientation of the flanges 502 within the vessel 501. In the embodiment depicted in FIG. 7, the locking mechanism 640 includes a screw 702 threaded through a block 701 affixed to the flange 506a. The block 501 may be coupled to the flange 506a by welding, screwing, riveting, bonding and the like. As the screw 702 is rotated to extend through the block 701, the screw 702 is tightened against the vessel 501 thereby locking the flange 506a in a predefined position. It is contemplated that the locking mechanism 640 may be part of, or interact with the hinge 510, or may be a clamp, pin or other device suitable for fixing the flange 506a (or other movable flanges 506) in a predefined position. Moreover, as the locking mechanism 640 allows the flanges 506 to be repositioned, the volumetric ratio between the compartments 504 may be reconfigured to allow greater flexibility in choice of catalysts utilized in the system 500.

Each of the movable flanges 506 includes a seal 650 that minimizes and/or eliminates catalyst cross contamination between compartments 504. The seal 650 is configured to interface between the each flange 506 and the sidewalls of the vessel 501. The seal 650 may be any device suitable for preventing catalyst from passing between the flange 506 and the vessel 501. Examples of suitable seals 520 include gaskets and brushes. The seal 650 may be disposed on one or both sides of the flanges 506.

Figure 8:
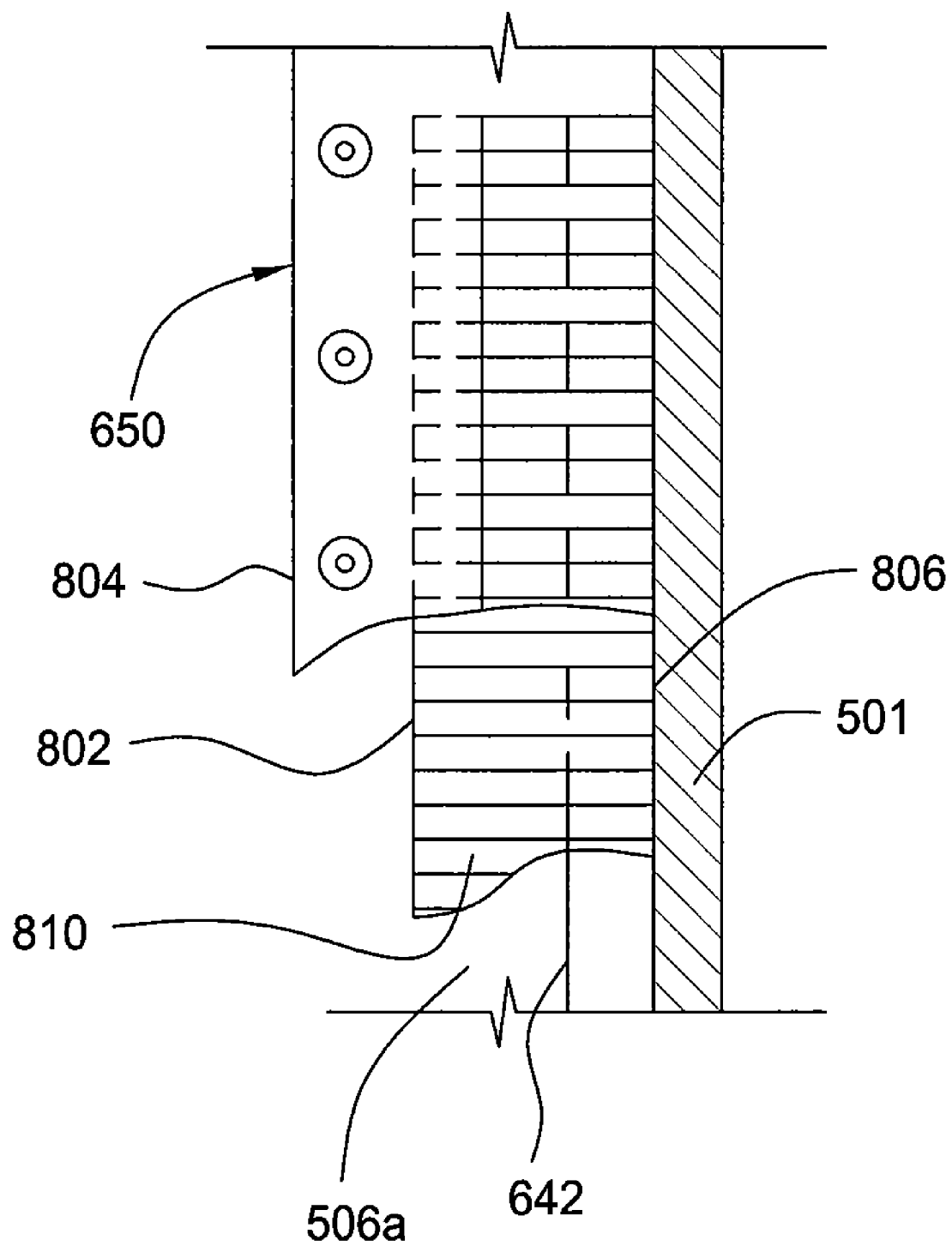
FIG. 8 depicts one embodiment of a separator seal.

Referring additionally to the partial sectional view of FIG. 8, the seal 650 is generally includes a sealing element 810 coupled at a first edge 802 to a mounting flange 804. The mounting flange 804 is coupled to the flange 506a in a position that allows a second edge 806 of the seal 650 to extend beyond the edge 642 of the flange 506 to engage the walls of the vessel 501. The second edge 806 of the seal 650 is generally configured to allow the flange 506 to move relative the vessel 501 while substantially preventing catalyst from passing between compartments through the gap defined between the edge 642 of the flange 506 and the vessel 501. In the embodiment depicted in FIG. 8, the seal 650 is a brush having its first edge 802 crimped or otherwise fixed in the mounting flange 804. The mounting flange 804 is riveted or otherwise secured to the flange 506. Although not shown in FIG. 8, it is contemplated that the seal 650 extends substantially along the entire edge of the flange 506 disposed adjacent the walls and bottom of the vessel 501.

Thus, the flanges 506 of the separator 502 may be evenly spaced apart as illustrated to divide the storage vessel 501 into compartments 504 of substantially equal volume, or the flanges 506 may be moved to spacing to divide the storage vessel 501 into at least two compartments 504 of different volumes. Although the separator 502 illustrated in FIG. 5 is depicted as having three movable flanges 502, those skilled in the art will appreciate that the separator 502 may comprise any number of movable flanges 502, for dividing the storage vessel 501 into any number of compartments 504.

Thus, the present invention represents a significant advancement in the field of fluid catalytic cracking systems. A storage vessel for process catalysts is provided that is capable of dispensing two or more catalysts, either separately or simultaneously. Embodiments of the invention allow the storage vessel to be adjusted to contain varying volumes of catalyst according to changing process needs. Process flexibility, therefore, is greatly enhanced.

While foregoing is directed to the preferred embodiment of the present invention, other and further embodiments of the invention may be devised without departing from the basic scope thereof, and the scope thereof is determined by the claims that follow.

The invention claimed is:

1. Apparatus for loading catalyst to a fluid catalyst cracking unit, comprising:
    a vessel;
    a plurality of catalyst storage regions associated with the vessel;
    a metering device associated with the vessel and configured to provided a metric indicative of an amount of catalyst dispensed from a selected one of the catalyst storage regions.

2. The apparatus of claim 1 further comprising:
    a pressure control system coupled to the vessel.

3. The apparatus of claim 1, wherein the metering device further comprises:
    a sensor configured to provide a metric indicative of a weight of the vessel and catalyst disposed therein.

4. The apparatus of claim 3, wherein the sensor further comprises:
    a load cell.

5. The apparatus of claim 1, wherein the metering device further comprises:
    a sensor configured to determine a change in volume of catalyst within the vessel or a rate of catalyst movement.

6. Apparatus for loading catalyst to a fluid catalyst cracking unit, comprising:
    a vessel configured to selectively provide a plurality of catalysts to a fluid catalyst cracking unit (FCCU), the vessel having a plurality of catalyst inlet ports for loading different catalysts into the vessel;
    a metering system configured to determine amounts of catalysts transferred to the FCCU;
    a controller coupled to the metering system and containing instructions that, when executed, causes a selective one of the plurality of catalysts to be delivered to the FCCU through the vessel.

7. The apparatus of claim 6, wherein the metering system further comprises:
    a valve coupled to the vessel and configured to control the flow of at least one catalyst within the vessel.

8. The apparatus of claim 6, further comprising:
    a sensor coupled to the controller and configured to provide a metric indicative of an amount of catalyst within the vessel.

9. The apparatus of claim 8, wherein the sensor further comprises:
    a load cell.

* * * * *